United States Patent
Ina

(10) Patent No.: US 12,549,416 B2
(45) Date of Patent: Feb. 10, 2026

(54) COMMUNICATION DEVICE, COMMUNICATION METHOD, AND COMPUTER-READABLE STORAGE MEDIUM

(71) Applicant: CANON KABUSHIKI KAISHA, Tokyo (JP)

(72) Inventor: Eigoro Ina, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/412,297

(22) Filed: Aug. 26, 2021

(65) Prior Publication Data

US 2021/0385111 A1 Dec. 9, 2021

Related U.S. Application Data

(63) Continuation of application No. PCT/JP2020/004217, filed on Feb. 5, 2020.

(30) Foreign Application Priority Data

Feb. 28, 2019 (JP) .................. 2019-036409

(51) Int. Cl.
*H04L 25/03* (2006.01)
*H04L 5/00* (2006.01)

(52) U.S. Cl.
CPC ...... *H04L 25/03006* (2013.01); *H04L 5/0048* (2013.01); *H04L 5/0098* (2013.01); *H04L 2025/0377* (2013.01)

(58) Field of Classification Search
CPC ............ H04L 27/2666; H04L 27/2603; H04L 5/0048; H04L 5/0007; H04L 5/0053; H04W 72/0453; H04W 84/12
See application file for complete search history.

(56) References Cited

U.S. PATENT DOCUMENTS

2017/0171878 A1 6/2017 Chun et al.
2018/0146426 A1* 5/2018 Park ................. H04L 27/2603
(Continued)

FOREIGN PATENT DOCUMENTS

CN 105830360 A 8/2016
CN 107113266 A 8/2017
(Continued)

OTHER PUBLICATIONS

Park et al, IEEE 802.11-18/1967r1, Overview of PHY Features for EHT, LG Electronics, Jan. 14, 2019 (Year: 2019).*
(Continued)

*Primary Examiner* — Aristocratis Fotakis
(74) *Attorney, Agent, or Firm* — Carter, DeLuca & Farrell LLP

(57) ABSTRACT

A communication device communicates a physical (PHY) frame including a preamble and a data field. The preamble includes a Legacy Short Training Field (L-STF), a Legacy Long Training Field (L-LTF), a Legacy Signal Field (L-SIG), an EHT (Extremely High Throughput) Signal Field (EHT-SIG-A), an EHT Short Training Field (EHT-STF), and an EHT Long Training Field (EHT-LTF), and the EHT-SIG-A includes at least one subfield indicating that the communication device performs communication in a frequency band more than 160 MHz.

5 Claims, 6 Drawing Sheets

(56) References Cited

U.S. PATENT DOCUMENTS

| | | | |
|---|---|---|---|
| 2019/0007973 A1* | 1/2019 | Lou | H04W 74/006 |
| 2019/0041509 A1 | 2/2019 | Jiang | |
| 2019/0045461 A1 | 2/2019 | Fang et al. | |
| 2019/0116513 A1* | 4/2019 | Verma | H04L 27/2666 |
| 2019/0116545 A1* | 4/2019 | Verma | H04W 48/08 |
| 2019/0349067 A1* | 11/2019 | Huang | H04B 7/0697 |
| 2020/0008185 A1* | 1/2020 | Chen | H04B 7/046 |
| 2020/0015219 A1* | 1/2020 | Asterjadhi | H04W 72/51 |
| 2020/0076552 A1* | 3/2020 | Cherian | H04W 72/27 |
| 2020/0112408 A1* | 4/2020 | Verma | H04B 7/0452 |
| 2020/0274662 A1* | 8/2020 | Huang | H04W 72/23 |
| 2020/0396742 A1* | 12/2020 | Park | H04W 76/11 |
| 2021/0168868 A1* | 6/2021 | Jang | H04L 5/0053 |
| 2021/0176643 A1* | 6/2021 | Jang | H04W 16/10 |
| 2021/0219236 A1 | 7/2021 | Ina | |
| 2021/0351820 A1* | 11/2021 | Huang | H04B 7/0452 |
| 2022/0201769 A1* | 6/2022 | Li | H04W 28/26 |
| 2022/0239451 A1 | 7/2022 | Park | |

FOREIGN PATENT DOCUMENTS

| | | |
|---|---|---|
| CN | 107113267 A | 8/2017 |
| IN | 201737010110 | 8/2017 |
| JP | 2018-050133 A | 3/2018 |
| WO | 2016/204435 A1 | 12/2016 |
| WO | 2018/232138 A1 | 12/2018 |
| WO | 2019/032216 A1 | 2/2019 |
| WO | 2020/242109 A1 | 12/2020 |

OTHER PUBLICATIONS

Chen et al, IEEE 802.11-18/1461r0, Discussions on the PHY features for EHT, Intel, Sep. 2018 (Year: 2018).*

Park et al, IEEE 802.11-18/1967r1, Overview of PHY Features for EHT, Lg Electronics, Jan. 2019 (Year: 2019).*

International Search Report issued by the Japan Patent Office on Apr. 21, 2020 in corresponding International Application No. PCT/JP2020/004217, with English translation.

Park, E. S. et al., "Overview of PHY features for EHT" IEEE 802.11-18/1967r1 <URL:https://mentor.ieee.org/802.11/dcn/18/11-18-1967-01-0eht-overview-of-phy-features-for-eht.pptx> (Jan. 2019) pp. 1-23, particularly slides 5, 6.

Vermani, S. et al., "Further ideas on EHT preamble design" IEEE 802.11-19/1870r4 <URL:https://mentor.ieee.org/802.11/dcn/19/11-19-1870-04-00be-further-ideas-on-eht-preamble-design.pptx> (Nov. 2019) pp. 1-8, particularly slides 5-7.

Extended European Search Report issued in corresponding EP Patent Application No. 20763174.8, dated Oct. 11, 2022.

Examination Report issued by the Intellectual Property Office of India on Mar. 9, 2022 in corresponding IN Patent Application No. 202147043645, with English translation.

Notice of Reasons for Refusal issued by the Japanese Patent Office on Apr. 21, 2023 in corresponding JP Patent Application No. 2019-036409, with English translation.

Zhang, H. et al., "802.11ax Preamble Design and Autodetection-r4" IEEE 802.11-15/0579 (Sep. 2015) pp. 1-10 <URL: https://mentor.ieee.org/802.11/dcn/15/11-15-0579-04-00ax-preamble-design-and-autodetection.pptx>.

Office Action issued by the Chinese Patent Office on Jul. 15, 2023 in corresponding CN Patent Application No. 202080017365.9, with English translation.

Korean Office Action issued in corresponding KR Patent Application No. 10-2021-7028453, dated Dec. 27, 2023, with English translation.

Zhang, H. et al., "802.11ax Preamble Design and Autodetection-r4" IEEE 802.11-15/0579 (Sep. 2015) pp. 1-46.

Korean Notice of Allowance issued in corresponding KR Patent Application No. 10-2021-7028453, dated Dec. 31, 2024, with English translation.

Son, Joo-hyung et al., "IEEE 802.11ax next generation wireless LAN standardization trends" Information and Communications Magazine (Oct. 2016) pp. 3-9, with English translation.

Office Action issued by the European Patent Office on Aug. 30, 2024 in corresponding EP Patent Application No. 20763174.8, pp. 1-23.

"Draft Standard for Information technology—Tele-communications and information exchange between systems Local and metropolitan area networks—Specific requirements; Part 11: Wireless LAN Medium Access Control (MAC) and Physical Layer (PHY) Specifications; Amendment 1: Enhancements for High Efficiency" IEEE P802.11ax/D4.0 (Feb. 2019) pp. 1-746, XP068149540, Retrieved from the Internet: URL:www.ieee802.org/11/private/Draft_Standards/11ax/Draft P802.11 ax_D4.0.pdf [retrieved on Feb. 1, 2019].

* cited by examiner

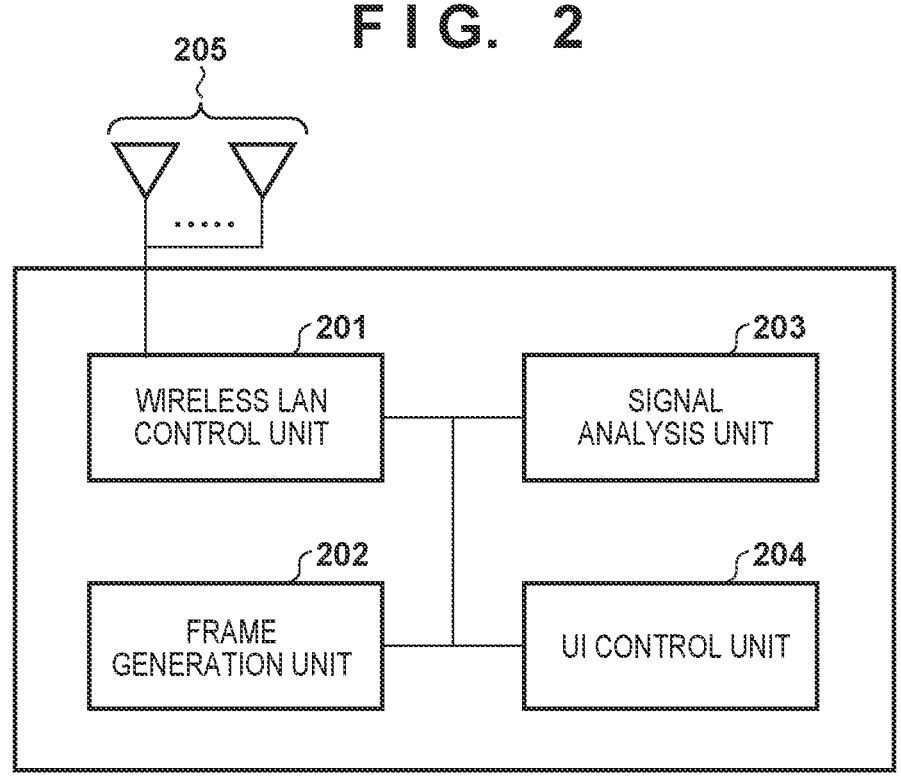
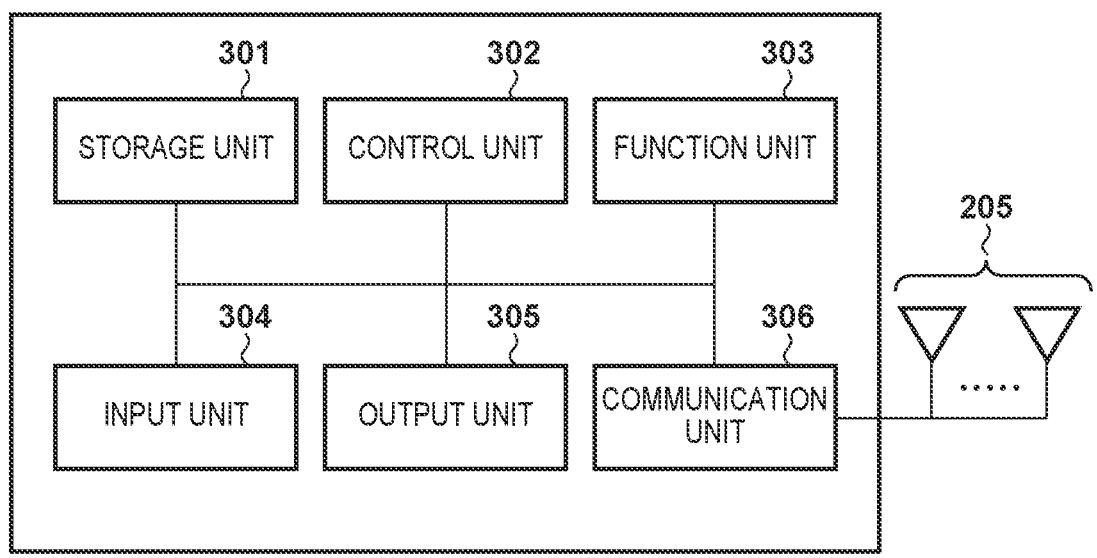

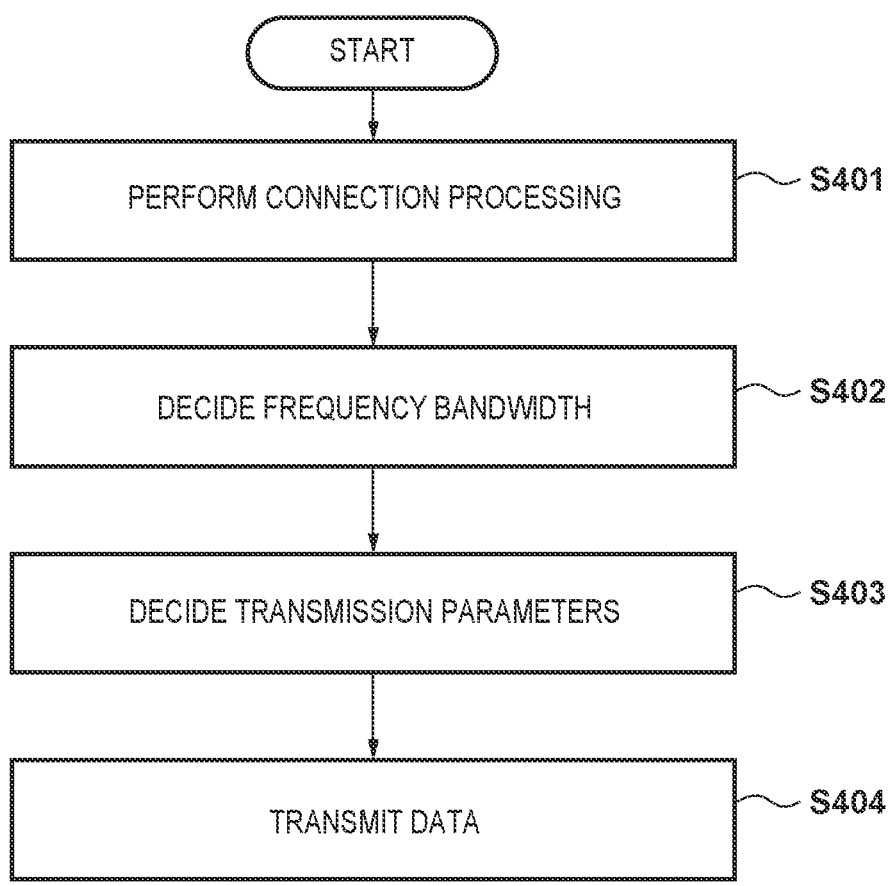

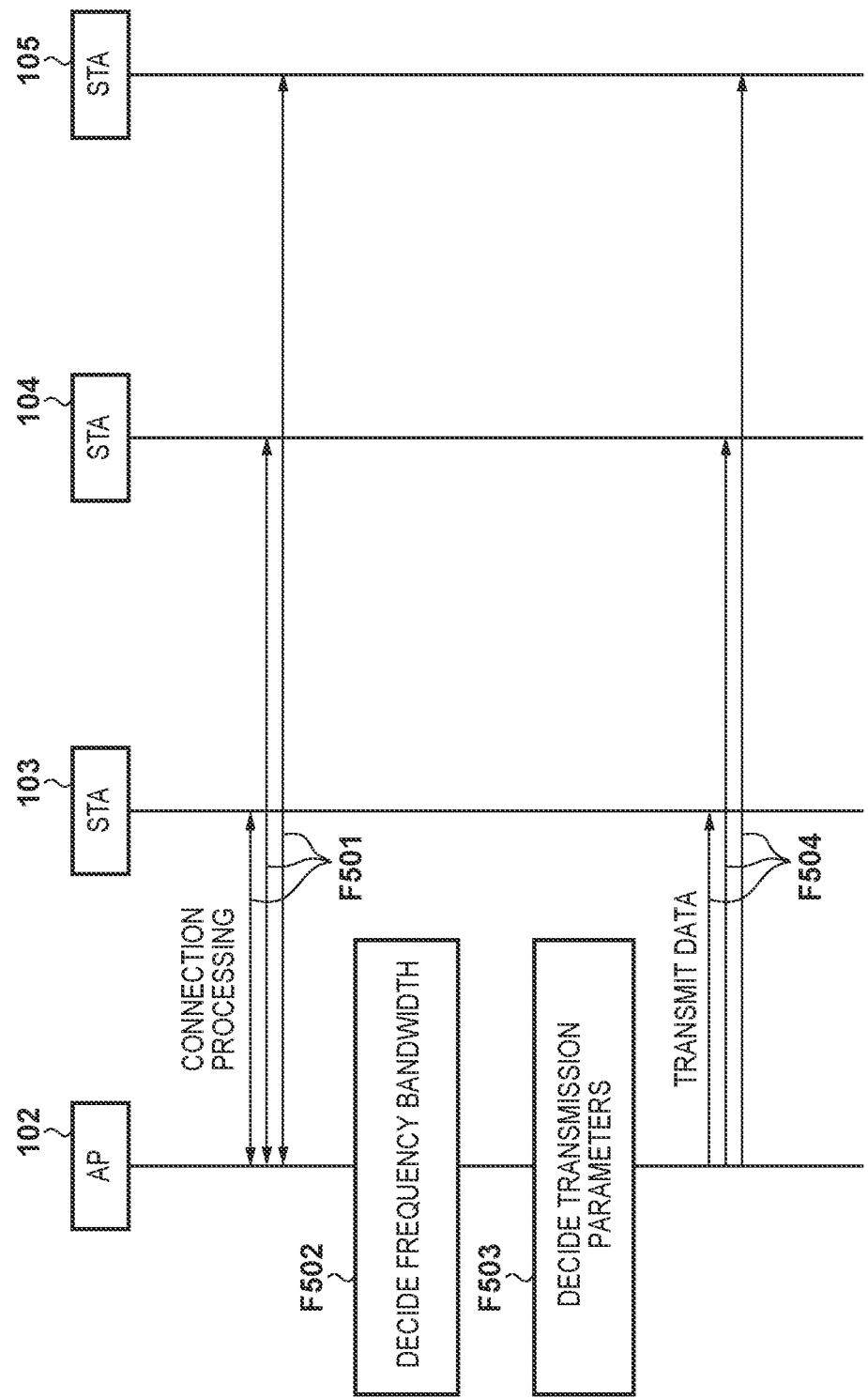

COMMUNICATION DEVICE, COMMUNICATION METHOD, AND COMPUTER-READABLE STORAGE MEDIUM

CROSS-REFERENCE TO RELATED APPLICATIONS

This application is a Continuation of International Patent Application No. PCT/JP2020/004217, filed Feb. 5, 2020, which claims the benefit of Japanese Patent Application No. 2019-036409 filed Feb. 28, 2019, both of which are hereby incorporated by reference herein in their entirety.

BACKGROUND OF THE INVENTION

Field of the Invention

The present invention relates to a communication control technique in a wireless LAN.

Background Art

The Internet usage has recently increased year by year along with the development of information communication technologies, and various communication techniques have been developed to cope with an increase in demand. In particular, wireless local area network (wireless LAN) techniques implement throughput improvement in Internet communications for packet data, audio, video, and the like by wireless LAN terminals, and various technological developments have still been conducted actively.

In the development of wireless LAN techniques, a lot of standardization works by the IEEE (Institute of Electrical and Electronics Engineers) 802, which is a standardization organization for wireless LAN techniques, play an important role. As one of the wireless LAN communication standards, the IEEE802.11 standards are known, including standards such as IEEE802.11n/a/b/g/ac and IEEE802.11 ax. For example, IEEE802.11ax implements a high peak throughput of up to 9.6 gigabits per second (Gbps) and additionally improves the communication speed under a congestion situation using OFDMA (Orthogonal frequency-division multiple access) (PTL 1).

Recently, in order to further improve throughput, a study group called IEEE802.11EHT (Extremely High Throughput) has been formed as a successor standard of IEEE802.11ax. As one of measures for throughput improvement that is a target for the IEEE802.11EHT, setting the maximum value of the frequency bandwidth to 320 MHz has been examined. Note that four frequency widths of 20 MHz, 40 MHz, 80 MHz, and 160 MHz are conventionally used in the wireless LAN.

CITATION LIST

Patent Literature

PTL 1: Japanese Patent Laid-Open No. 2018-50133

As described above, in the IEEE802.11EHT, use of a frequency bandwidth of 320 MHz has been examined. However, in the conventional standards for the wireless LAN, a mechanism configured to notify that communication is performed in a frequency bandwidth more than 160 MHz has not been defined.

SUMMARY OF THE INVENTION

The present disclosure provides a technique for notifying, in a preamble, that communication is performed in a frequency bandwidth more than 160 MHz.

A communication device according to one aspect of the present invention has the following characteristic features. That is, there is provided a communication device that transmits a physical (PHY) frame including a preamble and a data field, wherein the preamble includes: a Legacy Short Training Field (L-STF); a Legacy Long Training Field (L-LTF) arranged immediately after the L-STF in the frame; a Legacy Signal Field (L-SIG) arranged immediately after the L-LTF in the frame; an EHT Signal Field (EHT-SIG-A) arranged after the L-SIG in the frame; an EHT Short Training Field (EHT-STF) arranged immediately after the EHT-SIG-A in the frame; and an EHT Long Training Field (EHT-LTF) arranged immediately after the EHT-STF in the frame, and the EHT-SIG-A includes at least one subfield indicating that the communication device performs communication in a frequency band more than 160 MHz.

Further features of the present invention will become apparent from the following description of exemplary embodiments with reference to the attached drawings.

BRIEF DESCRIPTION OF THE DRAWINGS

FIG. 2 is a block diagram showing an example of the functional configuration of an AP;

FIG. 3 is a block diagram showing an example of the hardware configuration of the AP:

FIG. 4 is a flowchart showing processing executed by the AP;

FIG. 5 is a sequence chart showing processing executed in a wireless communication network;

DESCRIPTION OF THE EMBODIMENTS

Figure 1:
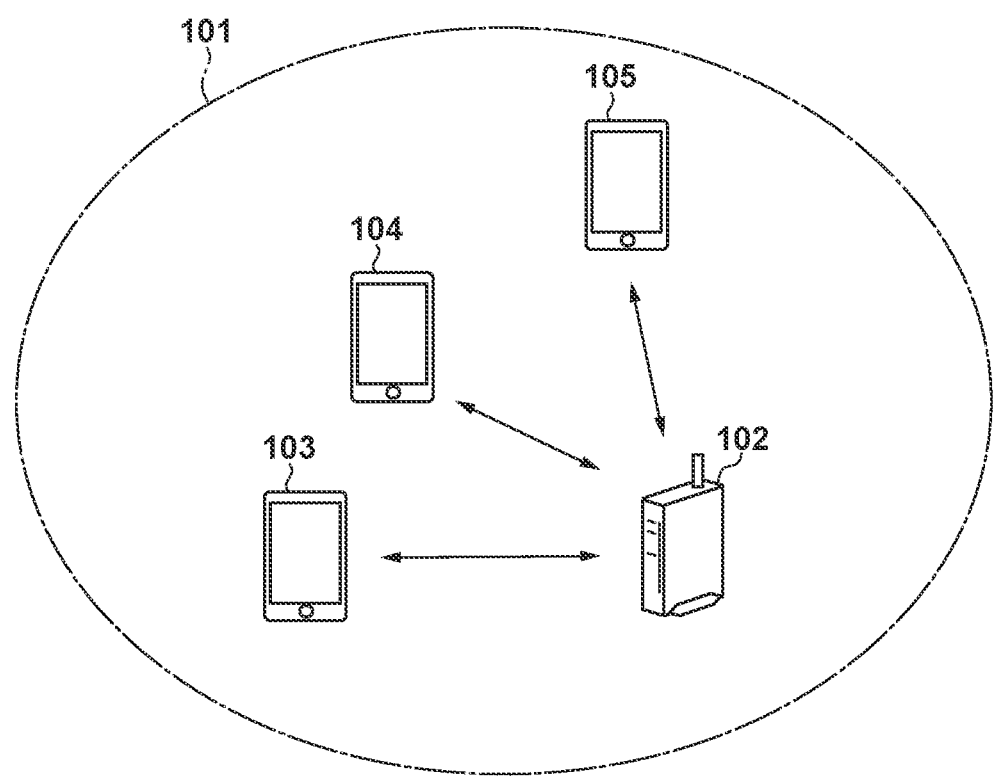
FIG. 1 is a view showing an example of the configuration of a network.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

(Network Configuration)

FIG. 1 shows an example of the configuration of a wireless communication network according to this embodiment. This wireless communication network is configured to include one access point (AP 102) and three STAs (STA 103, STA 104, and STA 105) as devices (EHT devices) complying with the IEEE802.11EHT (Extremely High Throughput)

standard. Note that it may be understood that EHT is an acronym of Extreme High Throughput. The AP 102 can be considered as one form of an STA because it has the same functions as the STAs 103 to 105 except that it has a relay function. STAs located in a circle 101 representing the area where a signal transmitted from the AP 102 reaches can communicate with the AP 102. The AP 102 communicates with the STAs 103 to 105 in accordance with the wireless communication method of the IEEE802.11 EHT standard. The AP 102 can establish a radio link with each of the STAs 103 to 105 via connection processing such as an association process complying with a standard of the IEEE80211 series.

Note that the configuration of the wireless communication network shown in FIG. 1 is merely an example for the description and, for example, a network including many EHT devices and legacy devices (communication devices complying with the IEEE802.11a/b/g/n/ax standards) in a wider area may be formed. Also, the arrangement of the communication devices is not limited to that shown in FIG. 1, and the following argument is applicable to various positional relationships of the various kinds of communication devices as well.

(Configuration of AP)

FIG. 2 is a block diagram showing the functional configuration of the AP 102. The AP 102 includes, as an example of its functional configuration, a wireless LAN control unit 201, a frame generation unit 202, a signal analysis unit 203, and a UI (User Interface) control unit 204.

The wireless LAN control unit 201 can be configured to include one or more antennas 205 and circuits configured to transmit/receive a radio signal (radio frame) to/from another wireless LAN device, and a program configured to control these. The wireless LAN control unit 201 executes communication control of the wireless LAN based on a frame generated by the frame generation unit 202 in accordance with the standard of the IEEE802.11 series.

The frame generation unit 202 generates a frame to be transmitted by the wireless LAN control unit 201 based on the result of analysis performed by the signal analysis unit 203 for a signal received by the wireless LAN control unit 201. The frame generation unit 202 may create a frame without depending on the analysis result of the signal analysis unit 203. The signal analysis unit 203 analyzes a signal received by the wireless LAN control unit 201. The UI control unit 204 accepts an operation by the user (not shown) of the AP 102 on an input unit 304 (FIG. 3), and performs control of transmitting a control signal corresponding to the operation to each constituent element or controls output (including display and the like) for an output unit 305 (FIG. 3).

FIG. 3 shows the hardware configuration of the AP 102 according to this embodiment. The AP 102 includes, as an example of its hardware configuration, a storage unit 301, a control unit 302, a function unit 303, the input unit 304, the output unit 305, a communication unit 306, and the one or more antennas 205.

The storage unit 301 is formed by both of a ROM and a RAM or one of them, and stores programs for performing various kinds of operations to be described later and various kinds of information such as communication parameters for wireless communication. Note that other than the memories such as a ROM and a RAM, a storage medium such as a flexible disk, a hard disk, an optical disk, a magnetooptical disk, a CD-ROM, a CD-R, a magnetic tape, a nonvolatile memory card, or a DVD may be used as the storage unit 301.

The control unit 302 is formed by, for example, a processor such as a CPU or an MPU, an ASIC (Application Specific Integrated Circuit), a DSP (Digital Signal Processor), an FPGA (Field Programmable Gate Array), or the like. Here, CPU is an acronym of Central Processing Unit, and MPU is an acronym of Micro Processing Unit. The control unit 302 executes the programs stored in the storage unit 301, thereby controlling the entire AP 102. Note that the control unit 302 may control the entire AP 102 by cooperation of the programs stored in the storage unit 301 and an OS (Operating System).

In addition, the control unit 302 controls the function unit 303 to execute predetermined processing such as image capturing, printing, or projection. The function unit 303 is hardware used by the AP 102 to execute predetermined processing. For example, if the AP 102 is a camera, the function unit 303 is an image capturing unit and performs image capturing processing. For example, if the AP 102 is a printer, the function unit 303 is a printing unit and performs print processing. For example, if the AP 102 is a projector, the function unit 303 is a projection unit and performs projection processing. Data to be processed by the function unit 303 may be data stored in the storage unit 301, or may be data communicated with an STA or another AP via the communication unit 306 to be described later.

The input unit 304 accepts various kinds of operations from a user. The output unit 305 performs various kinds of outputs for the user. Here, the output by the output unit 305 includes at least one of display on a screen, audio output by a loudspeaker, vibration output, and the like. Note that both the input unit 304 and the output unit 305 may be implemented by one module, like a touch panel.

The communication unit 206 controls wireless communication complying with the IEEE802.11EHT standard, or controls wireless communication complying with Wi-Fi or IP (Internet Protocol) communication. Also, the communication unit 306 controls the one or more antennas 205 to transmit/receive radio signals for wireless communication. In this case, MIMO (Multi Input Multi Output) communication using spatial streams is possible. The AP 102 communicates contents such as image data, document data, and video data with another communication device via the communication unit 306.

(Configuration of STA)

The functional configuration and the hardware configuration of the STAs 103 to 105 are the same as the functional configuration (FIG. 2) and the hardware configuration (FIG. 3) of the AP 102 described above, respectively. That is, each of the STAs 103 to 105 can be configured to include, as its functional configuration, the wireless LAN control unit 201, the frame generation unit 202, the signal analysis unit 203, and the UI control unit 204 and include, as its hardware configuration, the storage unit 301, the control unit 302, the function unit 303, the input unit 304, the output unit 305, the communication unit 306, and the one or more antennas 205.

(Procedure of Processing)

Next, the procedure of processing executed by the AP 102 configured as described above and the sequence of processing executed by the wireless communication system shown in FIG. 1 will be described with reference to FIGS. 4 and 5. FIG. 4 is a flowchart showing processing executed by the AP 102. The flowchart shown in FIG. 4 can be implemented when the control unit 302 of the AP 102 executes a control program stored in the storage unit 301 and executes calculation and processing of information and control of each hardware. FIG. 5 shows a sequence chart of processing executed by the wireless communication system.

Figure 6:
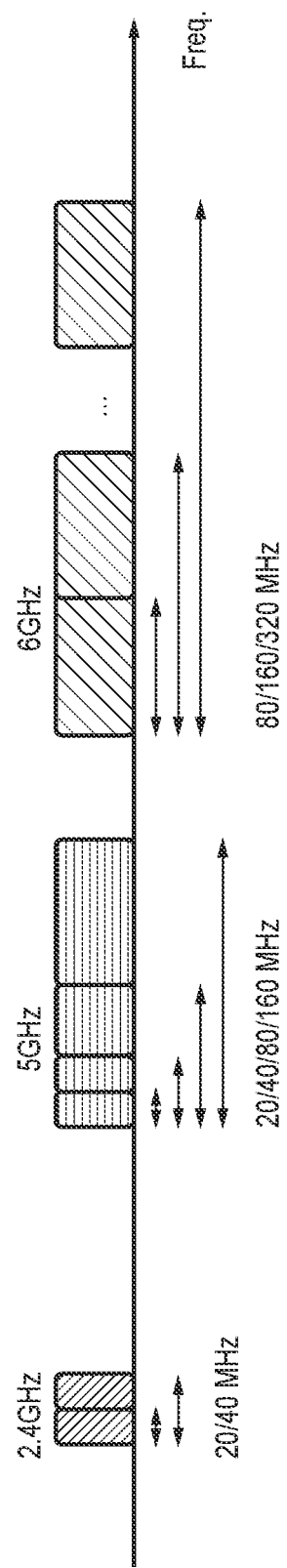
FIG. 6 is a view showing an example of the configuration of frequency bands used for wireless communication.

Before the description of FIGS. 4 and 5, the configuration of frequency bands used for wireless communication in this embodiment will be described with reference to FIG. 6. FIG. 6 shows an example of the configuration of frequency bands used for wireless communication. In the 2.4 GHz band conventionally used in a wireless LAN, a usable frequency bandwidth is 20 MHz or 40 MHz. Similarly, in the 5 GHz band conventionally used in a wireless LAN, a usable frequency bandwidth is one of 20 MHz, 40 MHz, 80 MHz, and 160 MHz. On the other hand, in a frequency band from 5.925 GHz to 7.125 GHz, which is called a 6 GHz band and includes frequencies recently planned to be newly opened to the wireless LAN, 80 MHz, 160 MHz, and 320 MHz are candidates of usable frequency bandwidths. Note that a frequency band in the 6 GHz band can be used not only in the IEEE802.11EHT standard but also in IEEE802.11x.

In FIGS. 4 and 5, the AP 102 performs connection processing complying with the standard of the IEEE802.11 series for each of the STAs 103 to 105 (step S401, F501). That is, frames such as Probe Request/Response, Association Request/Response, and Auth (authentication) are transmitted/received between the AP 102 and each of the STAs 103 to 105, thereby establishing a radio link. Next, the AP 102 decides a frequency bandwidth to be used for wireless communication (step S402, F502). The frequency bandwidth can be decided as a bandwidth set in advance in the wireless communication system. Alternatively, the frequency bandwidth may be decided by an operation on the input unit 304 by the user (not shown) of the AP 102.

Next, the AP 102 decides communication parameters including the frequency bandwidth decided in step S402 or F502, which are included in a radio frame to be transmitted (step S403, F503). Next, the AP 102 transmits data in a form of a radio frame including the decided transmission data communication parameters and data to the STAs 103 to 105 (step S404, F504).

(Frame Structure)

Figure 7:
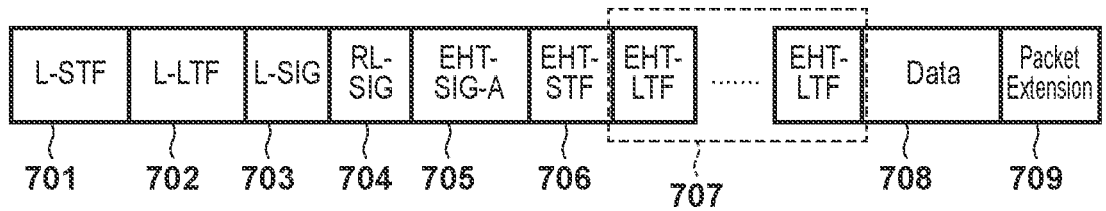
FIG. 7 is a view showing an example of the PHY frame structure of an EHT SU PPDU.
Figure 8:
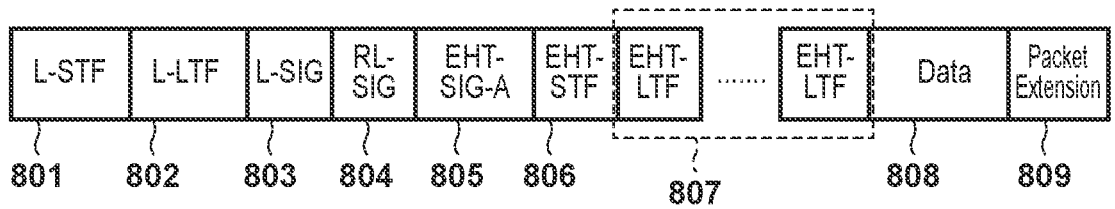
FIG. 8 is a view showing an example of the PHY frame structure of an EHT ER PPDU.
Figure 9:
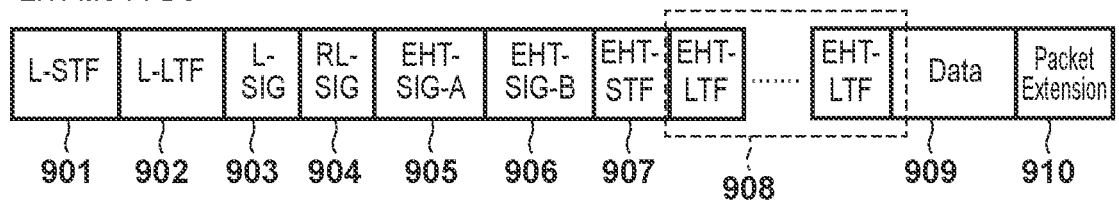
FIG. 9 is a view showing an example of the PHY frame structure of an EHT MU PPDU.
Figure 10:
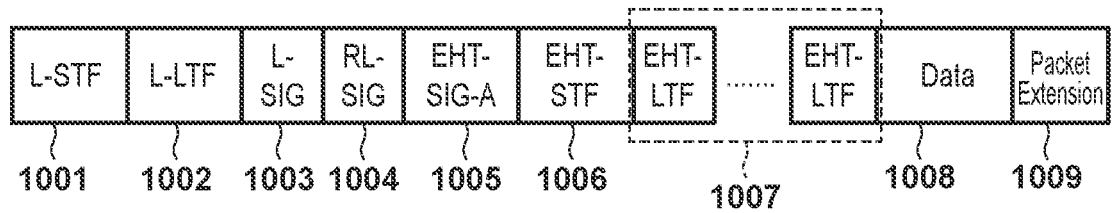
FIG. 10 is a view showing an example of the PHY frame structure of an EHT TB PPDU.

FIGS. 7 to 10 show examples of PHY (physical) frame structures of PPDUs defined by the IEEE802.11EHT standard and transmitted in step S404 or F504. Note that PPDU is an abbreviation of Physical Layer (PHY) Protocol Data Unit. FIG. 7 shows an example of the PHY frame structure of an EHT SU PPDU that is a PPDU for single-user (SU) communication (between an AP and a single STA). FIG. 8 shows an example of the PHY frame structure of an EHT ER PPDU that is a PPDU for communication in an extended area (communication distance) (Extended Range). The EHT ER PPDU is used in communication between an AP and a single STA. FIG. 9 shows an example of the PHY frame structure of an EHT MU PPDU that is a PPDU for multi-user (MU) communication (between an AP and a plurality of STAs). FIG. 10 shows an example of the PHY frame structure of an EHT TB (Trigger Based) PPDU having a structure without EHT-SIG-B in the EHT MU PPDU. When the EHT TB is used, EHT-SIG-B is not included because communication resources are allocated to a plurality of STAs using a trigger frame. The EHT TB PPDU is used in communication between an AP and a plurality of STAs.

Pieces of information commonly included in the PPDUs shown FIGS. 7 to 10 are an STF (Short Training Field), an LTF (Long Term Field), and an SIG (Signal Field). Taking FIG. 7 as an example, the PPDU head portion includes an L (Legacy)-STF 701, an L-LTF 702, and an L-SIG 703 having backward compatibility with the IEEE802.11a/b/g/n/ax standards. The L-STF 701 is used for detection of a PHY frame signal, automatic gain control (AGC), timing detection, or the like. The L-LTF 702 arranged immediately after the L-STF 701 is used for highly accurate frequency/time synchronization, obtainment of propagation channel information (CSI), or the like. The L-SIG 703 arranged immediately after the L-LTF 702 is used for transmitting control information including information such as a data transmission rate and a PHY frame length. A legacy device complying with the IEEE802.11a/b/g/n/ax standards can decode data of the above-described various kinds of legacy fields (the L-STF 701, the L-LTF 702, and the L-SIG 703). The various kinds of legacy fields are similarly included in the PPDUs shown in FIGS. 8 to 10 as well.

Next to the L-STF 701, the L-LTF 702, and the L-SIG 703 described above, the EHT SU PPDU shown in FIG. 7 includes an RL-SIG 704, an EHT-SIG-A 705, an EHT-STF 706, an EHT-LTF 707, a data field 708, and a Packet extension 709. The RL-SIG 704 may be absent. The EHT-SIG-A 705 is arranged after the L-SIG 703, the EHT-STF 706 is arranged immediately after the EHT-SIG-A 705, and the EHT-LTF 707 is arranged immediately after the EHT-STF 706. Note that the field including the L-STF 701, the L-LTF 702, the L-SIG 703, the RL-SIG 704, the EHT-SIG-A 705, the EHT-STF 706, and the EHT-LTF 707 is called a preamble. The EHT-SIG-A 705 includes Information such as EHT-SIG-A1 and EHT-SIG-A2 necessary for reception of the PPDU. Subfields that form the MT-SIG-A1 and the EHT-SIG-A2 included in the EHT-SIG-A 705 and a description thereof are shown in Table 1 and Table 2.

TABLE 1

| Bit Position | Subfield | Bit Count | Description |
|---|---|---|---|
| EHT-SIG-A1 B0 | Format | 1 | "1" is set for an EHT PPDU and an EHT ER PPDU to distinguish them from an EHT TB PPDU. |
| B1 | Beam Change | 1 | "1" is set if the pre-EHT of the PPDU is arranged in a space different from the first symbol of the EHT-LTF, or "0" is set if the pre-EHT is mapped similarly to the first symbol. |
| B2 | UL/DL | 1 | This subfield indicates whether the PPDU is for UL or DL, and has the same value as TXVECTOR UPLINK_FLAG. |
| B3-B6 | MCS | 4 | This subfield indicates the value of the Modulation and Coding Scheme. In a case of an EHT SU PPDU, n = 0, 1, 2, . . . , 11 (12 to 15 are reserved). In a case of an EHT ER SU PPDU and Bandwidth = 0, n = 0, 1, 2 (3 to 15 are reserved areas). In a case of an EHT ER SU PPDU and Bandwidth = 1, n = 0 for MCS 0 (1 to 15 are reserved areas). |
| B7 | DCM | 1 | This subfield indicates whether Dual Carrier Modulation is applied to the data field. If "0" is set in the STBC field, "1" is set. (If both the DCM and STBC fields are "1", neither of them is applied) If DCM is not applied. "0" is set. |
| B8-B13 | BSS Color | 6 | 6-bit number for identifying the BSS |
| B14 | Reserved | 1 | Reserved field |

TABLE 1-continued

| Bit Position | Subfield | Bit Count | Description |
|---|---|---|---|
| B15-B18 | Spatial Reuse | 4 | This subfield indicates whether Spatial Reuse is allowed during transmission of this PPDU. The value of Spatial Reuse field encoding shown in the separate table is set. |
| B19-B20 | Bandwidth | 2 | In a case of an EHT SU PPDU: "0" is set for 20 MHz, "1" is set for 40 MHz, "2" is set for 80 MHz, or "3" is set for 160 MHz (80 + 80 MHz). In a case of an EHT ER SU PPDU: "0" is set for 242-tone RU, or "1" is set for upper 106-tone RU of 20 MHz. |
| B21-B22 | GI + LTF Size | 2 | This subfield indicates the Guard Interval period and the EHT-LTF size. "0" is set for 1 × EHT-LTF and 0.8 μs GI, "1" is set for 2 × EHT-LTF and 0.8 μs GI, "2" is set for 2 × EHT-LTF and 1.6 μs GI, "3" is set if both the DCM and STBC fields are "1" and for 4 × EHT-LTF and 0.8 μs GI, or "3" is set for 4 × EHT-LTF other than the above case and 3.2 μs GI. |
| B23-B25 | NSTS And Midamble Periodicity | 2 | This subfield indicates the number of space-time streams and the midamble period for frame synchronization. If the Doppler field is "0", "(the number of space-time streams)— – 1" is set. If the Doppler field is "1". B23 and B24 indicate the number of space-time streams. B25 is "0" if the midamble period is 10, or "1" if the midamble period is 20. |

TABLE 2

| Bit Position | Subfield | Bit Count | Description |
|---|---|---|---|
| EHT-SIG-A2 B0-B6 | TXOP | 1 | Transmission Opportunity If TXOP_DURATION of TXVECTOR is UNSPECIFIED and there is no period information, 127 is set. If TXOP_DURATION of TXVECTOR is smaller than 512, a value smaller than 127 is set to set NAV. At this time, if B0 is "0", FLOOR of TXOP_DURATION/8 (round down) is set in B1 to B6. If B0 is "1", FLOOR of (TXOP_DURATION − 512)/8 is set in B1 to B6. |
| B7 | Coding | 1 | "0" is set for BCC (Binary Convolutional Code), or "1" is set for LDPC (Low Density Parity Check). |
| B8 | LDPC Extra Symbol Segment | 1 | This subfield indicates the presence/absence of an extra OFDM symbol segment for LDPC. |

TABLE 2-continued

| Bit Position | Subfield | Bit Count | Description |
|---|---|---|---|
| B9 | STBC | 1 | "1" is set in this field if STBC (Space-Time Block Coding) is used and the DCM subfield is "0", "1" is also set if neither DCM nor STBC is applied, or "0" is set otherwise. |
| B10 | Beamformed | 1 | "1" is set if beamforming steering is applied to the waveform of SU transmission. |
| B11-B12 | Pre-FEC Padding Factor | 2 | "0" is set if the Pre-FEC Padding Factor is 4, "1" is set if the Pre-FEC Padding Factor is 1, "2" is set if the Pre-FEC Padding Factor is 2, or "3" is set if the Pre-FEC Padding Factor is 3. |
| B13 | PE Disambigitity | 1 | Disambigitity field of Packet Extension |
| B14 | Reserved | 1 | Reserved field |
| B15 | Doppler | 1 | "1" is set if either of the following conditions is met: the number of OFDM symbols in the data field is larger than "the value indicated by the midamble period + 1", and a midamble exists, and the number of OFDM symbols in the data field is equal to or smaller than "the value indicated by the midamble period + 1", no midamble exists, and the channel changes rapidly. |
| B16-B19 | CRC | 4 | The CRC of the EHT-SIG-A (26 bits of A1 and 16 bits up to B15 of A2, that is, 42 bits in total) field up to here. |
| B20-B25 | Tail | 6 | An area to set "0" to indicate the end portion to a trellis convolution decoder. |

The frequency bandwidth decided in step S402 or F502 is shown in the Bandwidth subfield (B19-B20) in the EHT-SIG-A1 (Table 1). As shown in Table 1, when the value of the Bandwidth subfield is 0, the frequency bandwidth is 20 MHz. When the value is 1, the frequency bandwidth is 40 MHz. When the value is 2, the frequency bandwidth is 80 MHz. When the value is 3, the frequency bandwidth is 160 MHz (80+80 MHz). In this embodiment, 320 MHz is assumed to be used as a frequency bandwidth more than 160 MHz, as described with reference to FIG. 6. On the other hand, since only 2 bits are prepared for the Bandwidth subfield, only four types of frequency bandwidths can be designated. In this embodiment, 1 bit in the Reserved (reserved field) subfield (B14) in the EHT-SIG-A1 (Table 1) and/or the Reserved subfield (B14) in the EHT-SIG-A2 (Table 2) is used. Hence, the frequency bandwidth is designated using a total of 3 or 4 bits including the Bandwidth subfield in the EHT-SIG-A1.

The EHT-STF 706 next to the EHT-SIG-A 705 is an abbreviation of EHT Short Training Field, and its main object is to improve automatic gain control in MIMO transmission. The EHT-LTF 707 is an abbreviation of EHT Long Training Field and provides a means for estimating a MIMO channel to a receiver. The data field 708 can include MIMO communication data transmitted in the number of SSs (spatial streams) indicated by an NSTS And Midamble Periodicity subfield of the EHT-SIG-A1.

The EHT ER PPDU shown in FIG. 8 is a PPDU used to extend the communication distance, as described above, and is used in communication between an AP and a single STA.

The EHT ER PPDU includes an L-STF 801, an L-LTF 802, an L-SIG 803, an RL-SIG 804, an EHT-SIG-A 805, an EHT-STF 806, an EHT-LTF 807, a data field 808, and a Packet extension 809. The RL-SIG 804 may be absent. The L-LTF 802 is arranged immediately after the L-STF 801, the L-SIG 803 is arranged immediately after the L-LTF 802, the EHT-SIG-A 805 is arranged after the L-SIG 803, the EHT-STF 806 is arranged immediately after the EHT-SIG-A 805, and the EHT-LTF 807 is arranged immediately after the EHT-STF 806. Note that the field including the L-STF 801, the L-LTF 802, the L-SIG 803, the RL-SIG 804, the EHT-SIG-A 805, the EHT-STF 806, and the EHT-LTF 807 is called a preamble. Information included in each field has the same contents as in the EHT SU PPDU shown in FIG. 7, and a description thereof will be omitted. Note that in the EHT-SIG-A 805, the B14 bit of the EHT-SIG-A1 and the B14 bit of the EHT-SIG-A2 are Reserved subfields, as in the EHT SU PPDU shown in FIG. 7. A frequency bandwidth to be used for wireless communication can be set using the subfields as well.

The EHT MU PPDU shown in FIG. 9 is a PPDU used in communication of MU, as described above. The EHT MU PPDU includes an L-STF 901, an L-LTF 902, an L-SIG 903, an RL-SIG 904, an EHT-SIG-A 905, an EHT-SIG-B 906, an EHT-STF 907, an EHT-LTF 908, a data field 909, and a Packet extension 910. The RL-SIG 904 may be absent. The L-LTF 902 is arranged immediately after the L-STF 901, the L-SIG 903 is arranged immediately after the L-LTF 902, the EHT-SIG-A 905 is arranged after the L-SIG 903, the EHT-SIG-B 906 is arranged immediately after the EHT-SIG-A 905, the EHT-STF 907 is arranged immediately after the EHT-SIG-B 906, and the EHT-LTF 908 is arranged immediately after the EHT-STF 907. Note that the field including the L-STF 901, the L-LTF 902, the L-SIG 903, the RL-SIG 904, the EHT-SIG-A 905, the EHT-SIG-B 906, the EHT-STF 907, and the EHT-LTF 908 is called a preamble.

The EHT-SIG-A 905 includes Information such as EHT-SIG-A1 and EHT-SIG-A2 necessary for reception of the PPDU. Subfields that form the EHT-SIG-A1 and the EHT-SIG-A2 included in the EHT-SIG-A 705 and a description thereof are shown in Table 3 and Table 4.

TABLE 3

| Bit Position | Subfield | Bit Count | Description |
| --- | --- | --- | --- |
| EHT-SIG-A1 B0 | UL/DL | 1 | This subfield indicates whether the PPDU is for UL or DL, and has the same value as TX-VECTOR UPLINK_FLAG. |
| B1-B3 | SIGB MCS | 3 | This subfield indicates the MCS of the EHT-SIG-B field. "0" is set for MCS 0, "1" is set for MCS 1, "2" is set for MCS 2, "3" is set for MCS 3, "4" is set for MCS 4, or "5" is set for MCS 5. "6" and "7" are reserved areas. |
| B4 | SIGB DCM | 1 | "1" is set if the HT-SIG-B field is modulated using DCM. |
| B5-B10 | BSS Color | 6 | 6-bit number for identifying the BSS |
| B11-B14 | Spatial Reuse | 4 | This subfield indicates whether Spatial Reuse is allowed during transmission of this PPDU. The value of Spatial Reuse field encoding shown in the separate table is set. |
| B15-B17 | Bandwidth | 3 | "0" is set for 20 MHz, "1" is set for 40 MHz, or "3" is set for 160 MHz (80 + 80 MHz). |

TABLE 3-continued

| Bit Position | Subfield | Bit Count | Description |
| --- | --- | --- | --- |
| | | | When the SIGB Compression field is "0", "4" is set if only the secondary 20 MHz is puncturing in 80 MHz preamble puncturing, "5" is set if two 20 MHz of the secondary 40 MHz are puncturing in 80 MHz preamble puncturing, "6" is set if only the secondary 20 MHz is puncturing in 160 (pr 80 + 80) MHz preamble puncturing, or "7" is set if only the secondary 40 MHz is puncturing in 160 (or 80 + 80) MHz preamble puncturing. If the SIGH field is "1", the value between "4" to "7" means "reserved". |
| B18-B21 | Number of EHT-SIG-B Symbols or MU-MIMO Users | 4 | When the SIGB Compression field is "0", this subfield indicates the number of OFDMA symbols in the EHT-SIG-B. If the number of OFDM symbols in the EHT-SIG-B is smaller than 16, the number obtained by subtracting 1 from the number of OFDM symbols in the EHT-SIG-B is set. If at least one receiving terminal has set the capability of supporting the number of EHT SIG-B OFDM symbols larger than 16 to "0", "15" is set to indicate that the number of OFDM symbols in the EHT-SIG-B is 16. If all the receiving terminals have set the capability of supporting the number of EMT SIG-B OFDM symbols larger than 16 to "0" and the data rate of the EHT-SIG-B is smaller than MCS 4 which does not use DCM, "15" is set to indicate that the number of OFDM symbols in the EHT-SIG-B is equal to or larger than 16. When the SIGB Compression field is "1", the value set here means the number obtained by subtracting 1 from the number of MU-MIMO users. |
| B22 | SIG Compression | 1 | "1" is set if a Common field exists in the EHT-SIG-B. |
| B23-B24 | Gi + LTF Size | 2 | This subfield indicates the Guard Interval period and the EHT-LTF size. "0" is set for 4 × EHT-LTF and 0.8 μs GI, "1" is set for 2 × EHT-LTF and 0.8 μs GI, "2" is set for 2 × EHT-LTF and 1.6 μs GI, or "3" is for 4 × EHT-LTF and 3.2 μs GI. |
| B25 | Doppler | 1 | "1" is set if either of the following conditions is met: the number of OFDM symbols in the data field is larger than "the value indicated by the midamble period + 1", and a midamble exists, and the number of OFDM symbols in the data field is equal to or smaller than "the value indicated by the midamble period + 1", no midamble exists, and the channel changes rapidly. |

TABLE 4

| Bit Position | Subfield | Bit Count | Description |
|---|---|---|---|
| EHT-SIG-A2 B0-B6 | TXOP | 1 | Transmission Opportunity If TXOP_DURATION of TXVECTOR is UNSPECIFIED and there is no period information, 127 is set. If TXOP_DURATION of TXVECTOR is smaller than 512, a value smaller than 127 is set to set NAV. At this time, if B0 is "0", FLOOR of TXOP_DURATION/8 (round down) is set in B1 to B6. If B0 is "1", FLOOR of (TXOP_DURATION − 512)/8 is set in B1 to B6. |
| B7 | Reserved | 1 | Reserved field |
| B8-B10 | Number of EHT-LTF Symbols And Midamble Periodicity | 3 | This subfield indicates the number of EHT-LTFs. "0" is set for one EHT-LTF, "1" is set for two EHT-LTFs, "2" is set for four EHT-LTFs, "3" is set for six EHT-LTFs, or "4" is set for eight EHT-LTFs. When the Doppler field is "1", B8 and B9 indicate the number of EHT-LTF symbols, and B10 indicates the midamble period. |
| B11 | LDPC Extra Symbol Segment | 1 | This subfield indicates the presence/absence of an extra OFDM symbol segment for LDPC. |
| B12 | STBC | 1 | When the number of users of each RU (Resource Unit) is not larger than 1, "1" is set to indicate that STBC is used for encoding. |
| B13-B14 | Pre-FTC Padding Factor | 2 | "0" is set if the Pre-FEC Padding Factor is 4, "1" is set if the Pre-FEC Padding Factor is 1. "2" is set if the Pre-TEC Padding Factor is 2, or "3" is set if the Pre-FEC Padding Factor is 3. |
| B15 | PE Disambiguity | 1 | Disambiguity field of Packet Extension |
| B16-B19 | CRC | 4 | The CRC of the EHT-SIG-A (26 bits of A1 and 16 bits up to B15 of A2, that is, 42 bits in total) field up to here. |
| B20-B25 | Tail | 6 | An area to set "0" to indicate the end portion to a trellis convolution decoder. |

The EHT-SIG-B 906 includes information such as Common field and User Block field necessary for reception of the PPDU. Subfields that form the Common field and the User Block field included in the EHT-SIG-B 906 and a description thereof are shown in Table 5 and Table 6.

TABLE 5

| | Subfield | Bit Count | Description |
|---|---|---|---|
| Common field | RU Allocation | N × 8 | This subfield indicates RU allocation used in the data portion of a frequency axis When N = 1, EHT MU PPDUs of 20 MHz and 40 MHz are allocated. When N = 2, an EHT MU PPDU of 80 MHz is allocated. When N = 4, an EHT MU PPDU of 160 MHz or 80 + 80 MHz is allocated. |
| | Center 26-tone RU | 1 | This subfield is used only when the Bandwidth field of EHT-SIG-A field of an EHT MU PPDU is larger than 1 (if the frequency is equal to or higher than 80 MHz). This subfield indicates whether to use a 26-tone RU at the center. |
| | CRC | 4 | CRC calculation value |
| | Tail | 4 | Trailer bit, which is set to 0. |

TABLE 6

| | Subfield | Bit Count | Description |
|---|---|---|---|
| User Block field | User field | N × 21 | This subfield indicates information for each user. |
| | CRC | 4 | CRC calculation value |
| | Tail | 6 | Trailer bit, which is set to 0. |

The format of the User field changes depending on whether to do transmission to a plurality of users by OFDMA or MU-MIMO. Table 7 shows a description of the User field in a case of transmission by OFDMA, and Table 8 shows a description of the User field in a case of transmission by MU-MIMO.

TABLE 7

| Bit Position | Subfield | Bit Count | Description |
|---|---|---|---|
| User field B0-B10 | STA-ID | 11 | This subfield indicates the ID of an STA or an STA group that is the receiver of the RU of an EHT MU PPDU. |
| B11-B13 | NSTS | 3 | This subfield indicates the number of Space-time streams |
| B14 | Tx Beamforming | 1 | When transmission Beamforming is used, "1" is set. When transmission Beamforming is not used, "0" is set. |
| B15-B18 | MCS | 4 | This subfield indicates the value of Modulation and Coding Scheme |
| B19 | DCM | 1 | This subfield indicates whether Dual Carrier Modulation is applied to the data field. |
| B20 | Coding | 1 | When BCC (Binary Convolutional Code) is used, "0" is set. When LDPC (Low Density Parity Check) is used, "1" is set. |

TABLE 8

| Bit Position | Subfield | Bit Count | Description |
|---|---|---|---|
| User field B0-B10 | STA-ID | 11 | This subfield indicates the ID of an STA or an STA group that is the receiver of the RU of an EHT MU PPDU |
| B11-B14 | Spatial Configuration | 4 | This subfield indicates the number of Spatial Streams of an STA in MU-MIMO Allocation |
| B15-B18 | MCS | 4 | This subfield indicates the value of Modulation and Coding Scheme |

TABLE 8-continued

| Bit Position | Subfield | Bit Count | Description |
|---|---|---|---|
| B19 | Reserved | 1 | Reserved field |
| B20 | Coding | 1 | When BCC (Binary Convolutional Code) is used, "0" is set. When LDPC (Low Density Parity Check) is used, "1" is set. |

In the EHT MU PPDU, the frequency bandwidth to be used for wireless communication can be set using the Reserved subfield (B7) in the EHT-SIG-A2 (Table 4) in addition to the 3-bit Reserved subfield (B15-B17) in the EHT-SIG-A1 (Table 3).

The EHT TB PPDU shown in FIG. 10 is a PPDU having a structure without EHT-SIG-B in the EHT MU PPDU, as described above. If the EHT TB PPDU is used, allocation of communication resources to a plurality of STAs is done using a trigger frame. The EHT TB PPDU includes an L-STF 1001, an L-LTF 1002, an L-SIG 1003, an RL-SIG 1004, an EHT-SIG-A 1005, an EHT-STF 1006, an EHT-LTF 1007, a data field 1008, and a Packet extension 1009. The RL-SIG 1004 may be absent. The L-LTF 1002 is arranged immediately after the L-STF 1001, the L-SIG 903 is arranged immediately after the L-LTF 1002, the EHT-SIG-A 1005 is arranged after the L-SIG 1003, the EHT-STF 1006 is arranged immediately after the EHT-SIG-A 1005, and the EHT-LTF 1007 is arranged immediately after the EHT-STF 1006. Note that the field including the L-STF 1001, the L-LTF 1002, the L-SIG 1003, the RL-SIG 1004, the EHT-SIG-A 1005, the EHT-STF 1006, and the EHT-LTF 1007 is called a preamble.

A detailed description of subfields that form an EHT-SIG-A1 and an EHT-SIG-A2 of the EHT-SIG-A 1005 of the EHT TB PPDU will be omitted. The B23 bit of the EHT-SIG-A1 and the B7-B15 bits of the EHT-SIG-A2 are Reserved subfields. Hence, the frequency bandwidth to be used for wireless communication can be set using these subfields as well.

In the above-described way, every PPDU used in the IEEE802.11EHT standard can ensure a field of 3 bits or more in the EHT-SIG-A for designation of a frequency bandwidth and designate a frequency bandwidth more than 160 MHz.

Note that FIGS. 7 to 10 show frame structures having backward compatibility with the IEEE802.11a/b/g/n/ax standards. If backward compatibility need not be ensured, the fields of the L-STF and the L-LTF may be omitted. Instead, the EHT-STF and the EHT-LTF may be inserted.

According to the present invention, it is possible to notify, in a preamble, that communication is performed in a frequency bandwidth more than 160 MHz.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication device, comprising:
a communication unit configured to communicate an Extremely High Throughput Single-User physical layer protocol data unit (EHT SU PPDU), Extremely High Throughput Extended Range Single-User physical layer protocol data unit (EHT ER SU PPDU) and an Extremely High Throughput Multi-User physical layer protocol data unit (EHT MU PPDU);
at least one memory that stores a set of instructions; and
at least one processing circuit,
wherein the communication device is caused, by the at least one processing circuit executing the instructions and/or the at least one processing circuit itself operating, to perform operations comprising:
controlling to communicate, via the communication unit, the EHT SU PPDU including a preamble and a data field; and
controlling to communicate, via the communication unit, the EHT ER SU PPDU including a preamble and a data field;
controlling to communicate, via the communication unit, the EHT MU PPDU including a preamble and a data field,
wherein the preamble of the EHT SU PPDU, the preamble of the EHT ER SU PPDU, and the preamble of the EHT MU PPDU include:
a Legacy Short Training Field (L-STF);
a Legacy Long Training Field (L-LTF) arranged immediately after the L-STF;
a Legacy Signal Field (L-SIG) arranged immediately after the L-LTF;
an RL-SIG arranged immediately after the L-SIG;
a first Signal Field (SIG) arranged immediately after the RL-SIG;
an EHT Short Training Field (EHT-STF) arranged after the first SIG; and
an EHT Long Training Field (EHT-LTF) arranged immediately after the EHT-STF, and wherein the first SIG consists of a first field group and a second field group, and a total number of bits of the first SIG is 52 bits, wherein, in a case of the EHT MU PPDU, the first field group includes a first field comprised of three bits, each of which is located as a 16th bit, a 17th bit and 18th bit of the first field group, a second field comprised of six bits indicating a BSS color for identifying a Basic Service Set (BSS) and a third field comprised of a single bit indicating a direction of the communication, wherein, in a case of the EHT MU PPDU, the second field group, that consists of 26 bits, includes a fourth field indicating a CRC and a fifth field of a single bit which is located as an eighth bit of the second field group, wherein four bits comprised of the three bits of the first field and the single bit of the fifth field indicates a frequency bandwidth used for communication and is capable to indicate that the frequency bandwidth used for communication is 320 MHz, wherein, in a case of the EHT SU PPDU and EHT ER SU PPDU, the first field group includes a sixth field comprised of a single bit located as a 15th bit of the first field group, a seventh field comprised of two bits, each of which is located as a 20th bit and a 21st bit of the first field group and an eighth field indicating a BSS color for identifying a BSS and a ninth field indicating a direction of the communication, wherein, in a case of the EHT SU PPDU and EHT ER SU PPDU, the second field group, that consists of 26 bits, includes a tenth field indicating a CRC and an eleventh field comprised of a single bit which is located as a 15th bit of the second field group, wherein four bits comprised of the single bit of the sixth field, the two bits of the seventh field and the single bit of the eleventh field indicates a frequency bandwidth used for communication and is capable to indicate that the frequency bandwidth used for communication is 320 MHz, wherein, in a case of the EHT MU PPDU, the preamble of the EHT MU PPDU further includes a second SIG that includes a common field and one or more user specific field, wherein the second SIG is arranged immediately after the first SIG and the EHT-STF is arranged immediately after the second SIG, wherein the common field includes a RU Allocation subfield whose number of bits constituting the RU Allocation subfield is a multiple of 8, a Center 26-tone RU subfield comprised of a single bit, a CRC subfield comprised of four bits and a Tail subfield comprised of four bits, wherein, in a case where the communication device performs transmission using Orthogonal Frequency Division Multiple Access (OFDMA), the user specific field includes a STA-ID subfield comprised of 11 bits, an NSTS subfield comprised of three bits, a TX Beamforming subfield comprised of a single bit, a MCS subfield comprised of four bits, a DCM subfield comprised of a single bit, and a Coding subfield comprised of a single bit, wherein, in a case where the communication device performs transmission using Multi User Multi Input Output (MU-MIMO), the user specific field includes a STA-ID subfield comprised of 11 bits, a Spatial Configuration subfield comprised of four bits, a MCS subfield comprised of four bits, a Reserved subfield comprised of a single bit, and a Coding subfield comprised of a single bit, wherein, in a case of the EHT SU PPDU, the preamble of the EHT SU PPDU does not include the second SIG, wherein the EHT-STF is arranged immediately after the first SIG, and wherein, in a case of the EHT ER SU PPDU, the preamble of the EHT ER SU PPDU does not include the second SIG, wherein the EHT-STF is arranged immediately after the first SIG.

2. The communication device according to claim 1, wherein the communication device is a camera having an image capturing function or a printer having a printing function.

3. The communication device according to claim 1, wherein the first field group of the EHT SU PPDU further includes a Format field, a Beam Change field, a MCS field, a DCM field, a Spatial Reuse field, a G1+LTF Size field, and a NSTS And Midamble Periodicity field, the second field group of the EHT SU PPDU further includes a TXOP field, a Coding field, a LDPC Extra Symbol Segment field, a STBC field, a Beamformed field, a Pre-FEC Padding Factor field, a PE Disambiguity field, a Doppler field, and a Tail field, the first field group of the EHT ER SU PPDU further includes a Format field, a Beam Change field, a MCS field, a DCM field, a Spatial Reuse field, a G1+LTF Size field, and a NSTS And Midamble Periodicity field, the second field group of the EHT ER SU PPDU further includes a TXOP field, a Coding field, a LDPC Extra Symbol Segment field, a STBC field, a Beamformed field, a Pre-FEC Padding Factor field, a PE Disambiguity field, a Doppler field, and a Tail field, the first field group of the EHT MU PPDU further includes a SIGB MCS, a SIGB DCM field, a Spatial Reuse field, a Number of EHT-SIG-B Symbols or MU-MIMO Users field, a SIG Compression field, a Gi+LTF Size field, and a Doppler field, and the second field group of the EHT MU PPDU further includes a TXOP field, a Number of EHT-LTF Symbols And Midamble Periodicity field, a LDPC Extra Symbol Segment field, a STBC field, a Pre-FEC Padding Factor field, a PE Disambiguity field, and a Tail field.

4. A communication method for controlling a communication device having a communication unit comprising:

communicating, via the communication unit, an Extremely High Throughput Single-User physical layer protocol data unit (EHT SU PPDU) including a preamble and a data field;

communicating, via the communication unit, an Extremely High Throughput Extended Range Single-User physical layer protocol data unit (EHT ER SU PPDU) including a preamble and a data field;

communicating, via the communication unit, an Extremely High Throughput Multi-User physical layer protocol data unit (EHT MU PPDU) including a preamble and a data field, wherein the preamble of the EHT SU PPDU, the preamble of the EHT ER SU PPDU, and the preamble of the EHT MU PPDU include:

a Legacy Short Training Field (L-STF);
a Legacy Long Training Field (L-LTF) arranged immediately after the L-STF;
a Legacy Signal Field (L-SIG) arranged immediately after the L-LTF;
a RL-SIG arranged immediately after the L-SIG;
a first Signal Field (SIG) arranged immediately after the RL-SIG;

an EHT Short Training Field (EHT-STF) arranged after the first SIG; and an EHT Long Training Field (EHT-LTF) arranged immediately after the EHT-STF, and wherein the first SIG consists of a first field group and a second field group, and a total number of bits of the first SIG is 52 bits, wherein, in a case of the EHT MU PPDU, the first field group includes a first field comprised of three bits, each of which is located as a 16th bit, a 17th bit and 18th bit of the first field group, a second field comprised of six bits indicating a BSS color for identifying a Basic Service Set (BSS) and a third field comprised of a single bit indicating a direction of the communication, wherein, in a case of the EHT MU PPDU, the second field group, that consists of 26 bits, includes a fourth field indicating a CRC and a fifth field of a single bit which is located as an eighth bit of the second field group, wherein four bits comprised of the three bits of the first field and the single bit of the fifth field indicates a frequency bandwidth used for communication and is capable to indicate that the frequency bandwidth used for communication is 320 MHz, wherein, in a case of the EHT SU PPDU and EHT ER SU PPDU, the first field group includes a sixth field comprised of a single bit located as a 15th bit of the first field group, a seventh field comprised of two bits, each of which is located as a 20th bit and a 21st bit of the first field group and an eighth field indicating a BSS color for identifying a BSS and a ninth field indicating a direction of the communication, wherein, in a case of the EHT SU PPDU and EHT ER SU PPDU, the second field group, that consists of 26 bits, includes a tenth field indicating a CRC and an eleventh field comprised of a single bit which is located as a 15th bit of the second field group, wherein four bits comprised of the single bit of the sixth field, the two bits of the seventh field and the single bit of the eleventh field indicates a frequency bandwidth used for communication and is capable to indicate that the frequency bandwidth used for communication is 320 MHz, wherein, in a case of the EHT MU PPDU, the preamble of the EHT MU PPDU further includes a second SIG that includes a common field and one or more user specific field, wherein the second SIG is arranged immediately after the first SIG and the EHT-STF is arranged immediately after the second SIG, wherein the common field includes a RU Allocation subfield whose number of bits constituting the RU Allocation subfield is a multiple of 8, a Center 26-tone RU subfield comprised of a single bit, a CRC subfield comprised of four bits and a Tail subfield comprised of four bits, wherein, in a case where the communication device performs transmission using Orthogonal Frequency Division Multiple Access (OFDMA), the user specific field includes a STA-ID subfield comprised of 11 bits, an NSTS subfield comprised of three bits, a TX Beamforming subfield comprised of a single bit, a MCS subfield comprised of four bits a DCM subfield comprised of a single bit, and a Coding subfield comprised of a single bit, wherein, in a case where the communication device performs transmission using Multi User Multi Input Output (MU-MIMO), the user specific field includes a STA-ID subfield comprised of 11 bits, a Spatial Configuration subfield comprised of four bits, a MCS subfield comprised of four bits, a Reserved subfield comprised of a single bit, and a Coding subfield comprised of a single bit, wherein, in a case of the EHT SU PPDU, the preamble of the EHT SU PPDU does not include the second SIG, wherein the EHT-STF is arranged immediately after the first SIG, and wherein, in a case of the EHT ER SU PPDU, the preamble of the EHT ER SU PPDU does not include the second SIG, wherein the EHT-STF is arranged immediately after the first SIG.

5. The communication method according to claim 4, wherein the first field group of the EHT SU PPDU further includes a Format field, a Beam Change field, a MCS field, a DCM field, a Spatial Reuse field, a Gl+LTF Size field, and a NSTS And Midamble Periodicity field, the second field group of the EHT SU PPDU further includes a TXOP field, a Coding field, a LDPC Extra Symbol Segment field, a STBC field, a Beamformed field, a Pre-FEC Padding Factor field, a PE Disambiguity field, a Doppler field, and a Tail field, the first field group of the EHT ER SU PPDU further includes a Format field, a Beam Change field, a MCS field, a DCM field, a Spatial Reuse field, a Gl+LTF Size field, and a NSTS And Midamble Periodicity field, the second field group of the EHT ER SU PPDU further includes a TXOP field, a Coding field, a LDPC Extra Symbol Segment field, a STBC field, a Beamformed field, a Pre-FEC Padding Factor field, a PE Disambiguity field, a Doppler field, and a Tail field, the first field group of the EHT MU PPDU further includes a SIGB MCS, a SIGB DCM field, a Spatial Reuse field, a Number of EHT-SIG-B Symbols or MU-MIMO Users field, a SIG Compression field, a Gi+LTF Size field, and a Doppler field, and the second field group of the EHT MU PPDU further includes a TXOP field, a Number of EHT-LTF Symbols And Midamble Periodicity field, a LDPC Extra Symbol Segment field, a STBC field, a Pre-FEC Padding Factor field, a PE Disambiguity field, and a Tail field.

* * * * *